United States Patent [19]

Asanuma et al.

[11] Patent Number: 4,751,265
[45] Date of Patent: Jun. 14, 1988

[54] PRODUCTION OF PROPYLENE BLOCK COPOLYMER

[75] Inventors: Tadashi Asanuma; Ichiro Fujio; Nobutaka Uchikawa; Tetsunosuke Shiomura, all of Osaka, Japan

[73] Assignee: Mitsui Toatsu Chemicals, Inc., Tokyo, Japan

[21] Appl. No.: 83,924

[22] Filed: Aug. 3, 1987

Related U.S. Application Data

[63] Continuation of Ser. No. 883,454, Jul. 8, 1986, abandoned, which is a continuation of Ser. No. 792,188, Oct. 28, 1985, abandoned, which is a continuation of Ser. No. 355,045, Mar. 5, 1982, abandoned.

[30] Foreign Application Priority Data

| Mar. 5, 1981 | [JP] | Japan | 56-30535 |
| Mar. 5, 1981 | [JP] | Japan | 56-30536 |
| Mar. 12, 1981 | [JP] | Japan | 56-34659 |
| Mar. 12, 1981 | [JP] | Japan | 56-34660 |
| Jul. 15, 1981 | [JP] | Japan | 56-109481 |
| Jul. 15, 1981 | [JP] | Japan | 56-109482 |

[51] Int. Cl.$^4$ .............. C08F 2/02; C08F 2/12; C08L 23/16
[52] U.S. Cl. .......................... 525/53; 525/323
[58] Field of Search ...................... 525/53, 323

[56] References Cited

U.S. PATENT DOCUMENTS

| 3,732,335 | 5/1973 | Hermans | 525/323 |
| 4,066,718 | 1/1978 | Saito | 525/323 |
| 4,245,062 | 1/1981 | Suzuki | 525/323 |
| 4,291,138 | 9/1981 | Sato | 525/323 |
| 4,297,445 | 10/1981 | Short | 525/323 |
| 4,337,326 | 6/1982 | Shiga | 525/323 |

Primary Examiner—Paul R. Michl
Assistant Examiner—Mark R. Buscher
Attorney, Agent, or Firm—Sughrue, Mion, Zinn, Macpeak and Seas

[57] ABSTRACT

A propylene-ethylene block copolymer is produced by continuous bulk polymerization in which propylene alone is polymerized or propylene and ethylene are copolymerized at the ethylene/propylene reaction ratio of 6/94 using propylene as a liquid medium, and subsequently by batch-wise copolymerization in which propylene and ethylene are copolymerized at the ethylene/propylene reaction ratio from 85/15 to 5/95.

12 Claims, 6 Drawing Sheets

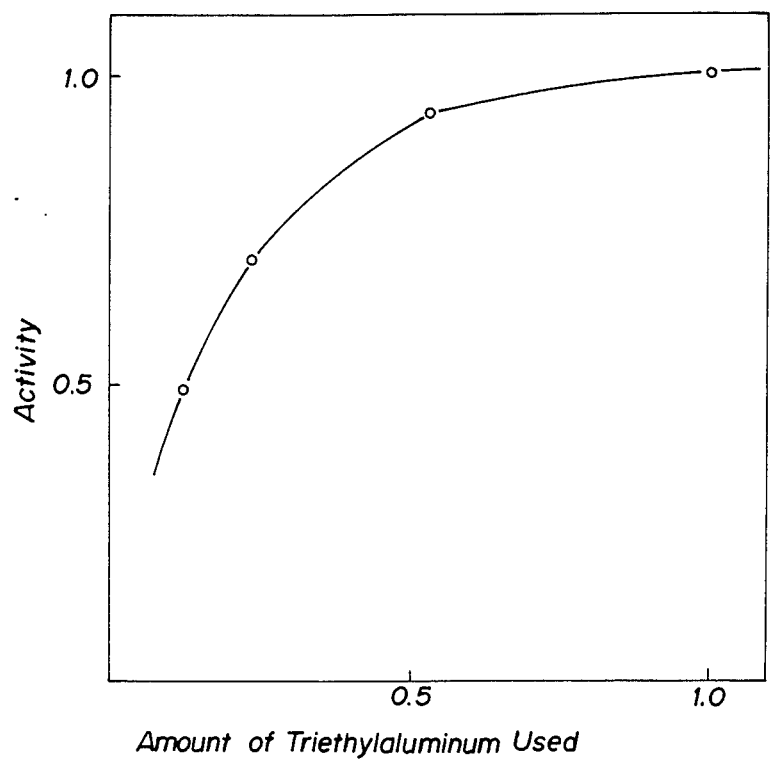

PRODUCTION OF PROPYLENE BLOCK COPOLYMER

This is a continuation, of application Ser. No. 883,454 filed 7/8/86, now abandoned, which is a continuation of application Ser. No. 792,188 filed 10/28/85, now abandoned, which is a continuation of application Ser. No. 355,045, filed 3/5/82 abandoned.

BACKGROUND OF THE INVENTION

The present invention relates to a process for producing a propylene-ethylene block copolymer having high rigidity and impact resistance. Since the invention of a stereospecific catalyst by Ziegler and Natta, crystalline polyolefins have been used as general-purpose resins of superior performance and their production has increased throughout the world in recent years because of their outstanding rigidity, heat resistance, and lightness in weight. However, due to a disadvantage of being brittle at low temperatures, crystalline polypropylene is not suitable for applications that require impact resistacne at low temperatures. To remedy this disadvantage, a great deal of study has been made and there are proposed many methods for improvement. Industrially useful methods among them include the block copolymerization of propylene and other olefins, particularly ethylene, as disclosed in Japanese Patent Publication Nos. 38-14834 (1963), 39-1836 (1964), and 39-15535 (1964). These methods, however, suffer from a disadvantage that the resulting block copolymer is poorer in rigidity and transparency than crystalline polypropylene and the moldings produced therefrom are liable to whitening on bending and impact deformation. To solve this problem, there was proposed a method for carrying out block copolymerization in three stages, a disclosed in Japanese Patent Publication Nos. 44-20621 (1969) and 49-24593 (1974). These methods result in block copolymers having outstanding physical properties. According to these methods, copolymerization is performed in an inert solvent such as n-heptane using a catalyst of comparatively low activity, in which case the inert solvent has to be recovered, an extremely complex post-treatment is required, and a considerably large portion of polymer is soluble in the inert solvent. These factors lead to the great increase of poduction cost. On the other hand, there were proposed in Japanese Patent Publication No. 42-17488 (1967) and Japanese Laid-open Patent Nos. 49-120986 (1974) and 52-3684 (1977) methods for producing block copolymers by bulk polymerization or gas-phase polymerization in which the recovery of inert solvent is comparatively easy or is not virtually required, or virtually no inert solvent is employed. According to these methods, virtually no inert solvent is used, and consequently the solvent purification step is omitted and the drying of polymer is simplified to a great extent. Nevertheless, the step for removing catalyst residues is required because the catalyst employed is not sufficient in activity. Moreover, in bulk polymerization and gas-phase polymerization, it is difficult to remove polymers of low molecular weight and low crystallinity, and this deteriorates the properties of the resulting polymer and increases the viscosity of the resulting polymer, making the handling of the polymer inconvenient. There is known another method for producing propylene-ethylene block copolymer continuously to increase the productivity per unit time and per unit volume of polymerization reactor. A continuous process often involves problems which are not encountered in batch-wise process. This is particularly true in the production of block copolymers. In order to impart desired properties as mentioned above to the polymer, it is necessary to provide several reaction stages in which the ethylene/propylene reaction ratio is different. If block copolymers of many kinds are to be produced, it is necessary to install as many reaction vessels as the reaction stages. In multistage polymerization using a series of reaction vessels, the quantity of polymerization per unit weight of catalyst varies from one reaction vessel to another. Therefore, the resulting polymers are quite different in the properties depending on whether the polymers are produced by a batch-wise process or continuous process. In bulk polymerization in which propylene per se is used as a liquid medium, the following reaction vessel is increased in pressure in order to increase the ethylene/propylene reaction rate in the following-stage. Such arrangements make it necessary to transfer by pressure the slurry from the low pressure side to the high pressure side. Such a step requires an expensive equipment and involes a danger of line clogging with molten polymers.

SUMMARY OF THE INVENTION

It is an object of the present invention to provide a process for producing a propylene-ethylene copolymer having high impact resistance and high rigidity. According to this invention, the process is free from such difficulties as sticking of polymer to the production equipment and aggregation of polymer during polymerization or drying of polymer. According to the process of this invention, it is possible to produce said propylene-ethylene copolymer without removing catalyst residues and low-molecular weight, low-crystalline polymer which is of no commerical value.

It is another object of the present invention to provide a process for producing a propylene-ethylene copolymer having high impact resistance and high rigidity, said process being characterized in that the productivity per unit time and per unit volume of reaction vessel is improved without impairing substantially the properties of the resulting polymer, as compared with batch-wise polymerization.

The present invention relates to an improved process for producing a propylene-ethylene block copolymer by multistage polymerization with different ethylene/propylene reaction ratios in the presence of a stereospecific catalyst using a polymerization equipment composed of two or more polymerization vessels connected together, wherein said improvement comprising polymerizing propylene alone or copolymeerizing propylene and ethylene at the ethylene/propylene reaction ratio lower than 6/94 by weight by continous bulk polymerization using as a medium propylene with substantially no inert medium in at least one preceding vessel of two or more polymerization vessels connected together, transferring the resulting polymer slurry to the following polymerization vessel in which polymerization is performed by batch-wise bulk polymerization using as a medium propylene with substantially no inert medium at the ethylene/propylene reaction ratio of 15/85 to 95/5 by weight.

BRIEF DESCRIPTION OF THE DRAWINGS

FIG. 6 is a graph showing the quantity of triethylaluminum used and the catalyst activity.

DETAILED DESCRIPTION OF THE INVENTION

Figure 1:
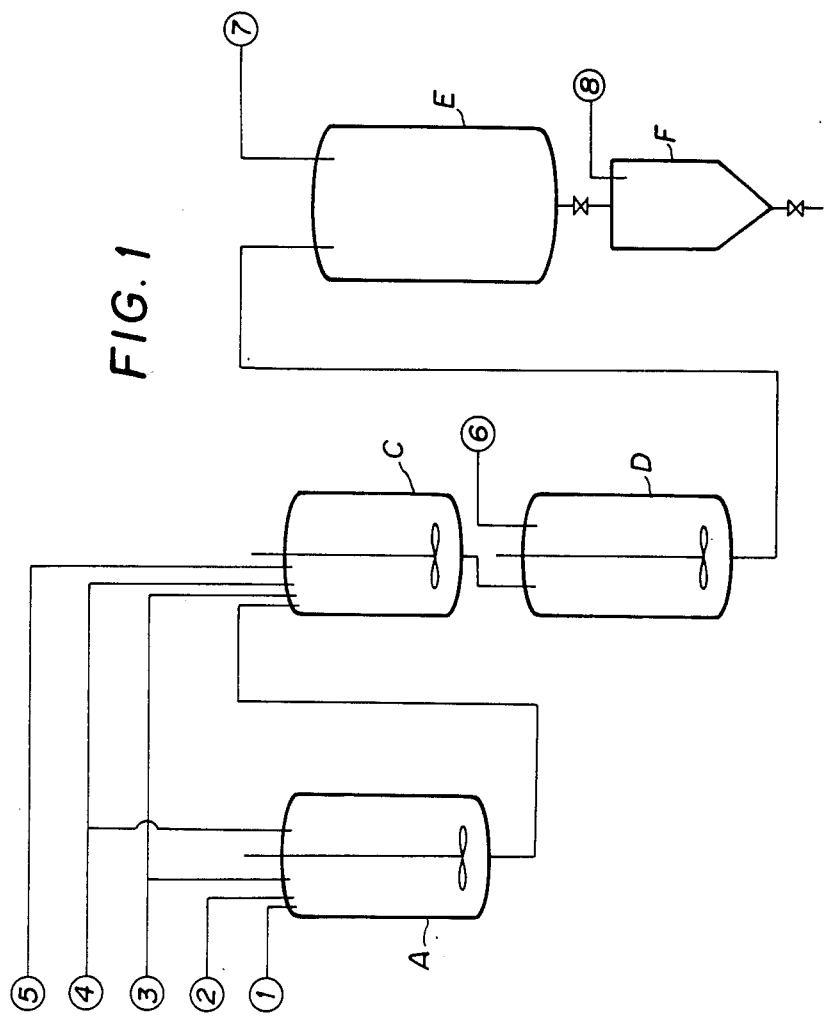
FIG. 1 is a schematic illustration showing an example of the polymerization equipment to carry out the process of this invention, wherein:
- A: Autoclave for continuous polymerization,
- C: Autoclave for batch-wise polymerization,
- D: Autoclave for deactivation of catalyst,
- E: Flush tank,
- F: Hopper,
- 1: Catalyst slurry mixture,
- 2: Triethylaluminum,
- 3: Propylene,
- 4: Hydrogen,
- 5: Ethylene,
- 6: Isopropanol,
- 7: Discharge pipe for unreacted gas, and
- 8: Discharge pipe for unreacted gas.

According to the process of this invention, a propylene-ethylene copolymer is produced by copolymerizing propylene and ethylene using a catalyst containing titanium as an effective ingredient and using a polymerization equipment composed of at least two polymerization vessels connected together. The copolymerization is accomplished in at least two polymerization stages in which the ethylene/propylene reaction ratio is different. In the preceding stage, continuous bulk polymerization is performed using propylene per se as a polymerization solvent, and in the following stage, batch-wise bulk polymerization is performed in the same manner as in the preceding stage.

The catalyst used in the process of this invention is a stereospecific catalyst which is employed for the production of stereoregular polypropylene. Examples of such catalyst include one which is produced by grinding a mixture of titanium trichloride and aluminum chloride, followed by activation, one which is produced by adding an electron donor to the above-mentioned mixture at the time of grinding, one which is produced by treating the above-mentioned product with an inert hydrocarbon, and one which is produced by reducing titanium tetrachloride with an organoaluminum and then treating the resulting product with an electron donor compound. The most preferable catalyst is composed of (a) a solid catalyst containing at least Mg, Ti, and Cl, (b) an organoalumimum compound, and (c) a compound having C—O and/or C—N bonds, and has the activity greater than 4000 g/g of solid catalyst. The solid catalyst mentioned above can be obtained by various methods as disclosed in Japanese Laid-open Patent Nos. 54-103494 (1979), 54-116079 (1979), and 55-102606 (1980). The above-mentioned compound containing C—O and/or C—N bonds is exemplified by esters, ethers, orthoesters, alkoxysilicons, amines, amides, and phosphate esters. Preferable among them are ethyl benzoate, methyl toluylate, methyl o-benzoate, tetraethoxysilane, phenyltriethoxysilane, dibutyl ether, triethylamine, diethylaniline, and triethyl phosphate.

One of the features of this invention is that propylene alone is polymerized or propylene and ethylene are copolymerized at the ethylene/propylene reaction rate less than 6/94 by weight by continuous bulk polymerization in at least one preceding polymerization vessel of a polymerization equipment composed of two or more vessels connected together, using, as a medium, propylene per se containing substantially no inert solvent. The polymerization in this stage is referred to as the preceding polymerization hereinafter. The continuous polymerization should preferably produce 60 to 95 wt % of the total polymer to be produced, and the polymerization temperature should preferably be 60° to 85° C.

If the preceding polymerization is performed with the ethylene/propylene reaction ratio greater than 6/94, the resulting polymer is low in bulk density, becomes high in stickiness, causing aggregation of powder in the drying step, and contains more propylene-soluble polymers, causing clogging of pipes and making the removal of polymerization heat difficult. If the polymerization temperature is higher than 85° C., the resulting polymer is low in bulk density, the productivity of polymer per unit volume is decreased, and the catalyst activity decreases rapidly, with the result that the productivity of polymer per unit weight of catalyst is decreased. If the polymerization temperature is lower than 60° C., the productivity per unit weight of catalyst and per unit time is decreased and the resulting polymer is low in stereoregularity, with the result that the polymer is low in rigidity and the polymer contains more propylenesoluble polymer, causing aggregation in the drying process. If the polymer produced in the preceding polymerization is less than 60 wt % of the total polymer to be produced, the resulting block copolymer is very low in rigidity, and if it is higher than 95 wt %, the improvement in impact resistance is not sufficient.

The preceding polymerization can be performed partly batch-wise, but it is preferable to perform continuous polymerization as far as possible in order to increase the productivity. This continuous polymerization can be performed in one vessel, but it is preferable to perform polymerization in two or more vessels connected in series so that the polymerization reaction is performed uniformly per unit weight of catalyst.

Another feature of this invention is that the polymer slurry obtained in the above-mentioned continuous polymerization is transferred to the following polymerization vessel, in which at least 80 wt % of the total quantity of polymerization is produced by batch-wise bulk polymerization at the ethylene/propylene reaction ratio of 15/85 to 95/5, using as a medium propylene per se containing substantially no inert medium. The polymerization in this stage is referred to as the following polymerization hereinafter.

The above-mentioned preceding continuous polymerization vessel and the following batch-wise polymerization vessel are combined as follows:

(1) Two or more polymerization vessels are connected in series, and continuous polymerization is performed in all the vessels except the last, and batch-wise polymerization is performed in the last vessel.

(2) The last one of the polymerization vessels connected in series is connected to two or more vessels arranged in parallel, and batch-wise polymerization is performed alternately in the parallel vessels.

The preferred embodiments of the polymerization in the process of this invention are as follows:

(a) When the polymer slurry is transferred from the preceding polymerization vessel to the following polymerization vessel, a catalyst deactivator is added to the slurry, so that the catalyst activity is decreased to less than ⅔ of that which would be when said catalyst deactivator is not added. Further, the catalyst activity is decreased to less than ½ by adding a catalyst deactivator on completion of polymerization in the batch-wise polymerization vessel.

(b) When the polymer slurry is transferred from the preceding polymerization vessel to the following polymerization vessel, a catalyst deactivator is added to the slurry, so that the catalyst activity is decreased to less than ⅔ of that which would be when said catalyst deactivator is not added. After completion of polymerization in the batch-wise polymerization vessel, the catalyst is deactivated within the time less than ⅓ of the prescribed time for polymerization in the batch-wise polymerization vessel.

(c) When the polymer slurry is transferred from the preceding polymerization vessel to the following polymerization vessel, a catalyst deactivator is added to the slurry, so that the catalyst activity is decreased to less than ¼ of that which would be when said catalyst deactivator is not added. After the transfer of the slurry is complete, an organoaluminum compound as an activator is added so that the catalyst activity is increased to more than 1.1 times that which would be before said catalyst activator is added. On completion of the following polymerization, a catalyst deactivator is added so that the catalyst activity is decreased to less than ½ of that which would be before said deactivator is added.

(d) When the polymer slurry is transferred from the preceding polymerization vessel to the following polymerization vessel, a catalyst deactivator is added to the slurry, so that the catalyst activity is decreased to less than ¼ of that which would be when said catalyst deactivator is not added. After the transfer of the slurry is complete, an organoaluminum compound is added so that the catalyst activity is increased to more than 1.1 times that which would be before said compound is added. On completion of the following polymerization, the catalyst is deactivated within the time less than ⅓ of the prescribed time for polymerization in the following polymerization vessel.

The catalyst deactivator mentioned above can be any organic compounds and inorganic compounds such as $AlCl_3$ and $SiCl_4$ which deactivate the catalyst. Those compounds which decrease the catalyst acitivity without greatly decreasing the stereoregularity of the resulting polymer, are preferable. They are exemplified by the compound having at least one C—O bond or C—N bond which is used as a prefrable ingredient of the above-mentioned catalyst. Specific examples of such compounds are as mentioned above.

In the case where hydrogen is used as a molecular weight modifier, a so-called degassing vessel may be installed between the preceding polymerization vessel and the following polymerization vessel in order to remove the hydrogen.

The stage in which polymerization takes place with the ethylene/propylene reaction rate in the range of 15/85 to 95/5 by weight is an essential step to obtain a propyleneethylene block copolymer superior in impact resistance. The polymerization temperature should preferably be 30° to 65° C. If the resulting block copolymer is to have balanced properties such as impact resistance, rigidity, transparency, and resistance to whitening due to impact and bending, it is preferable to carry out the following polymerization in several stages with the ethylene/propylene reaction ratio in the range from 15/85 to 95/5 by weight. For instance, the following polymerization may be carried out in two stages, with the reaction ratio of 15/85 to 60/40 by weight in the first stage and with the reaction ratio of 50/50 to 95/5 in the second stage. Also, polymerization may be performed in several stages, each stage giving polymerization of different molecular weight. Further, polymerization in several stages may be accomplished with varied ethylene/propylene reaction ratios and varied molecular weight . The reason why the batch-wise polymerization is performed with the ethylene/propylene reaction ratio in the 15/85 to 95/5 by weight is to perform multi-stage ion in order to achieve the balanced porperties as mentioned above. If the multi-stage polymerization is to be carried out continuously, it is necessary to provide as many polymerization vessels as the stages. This is not economical. When the multi-stage polymerization is carried out continuously using the stages which are greatly different in the ethylene/propylene reaction rate or in the molecular weight, the resulting copolymer gives moldings having rough surfaces and decreased impact resistance, although the cause for this is not known.

If the polymerization in the following stage is carried out above 65° C., a large quantity of polymer dissolves in propylene, forming a large quantity of low-molecular weight, low-crystalline polymer of almost no commercial value after filtration or counter-current washing with propylene. This raises the product cost. If the excess monomer is removed by evaporation, the polymer dissolved in propylene deposits on the powder surface, making the powder sticky and forming aggregates. This makes handling difficult. In addition, the bulk density of polymer decreases and the productivity per unit volume decreases to a great exent.

If polymerization is carried out below 30° C., it is difficult to remove polymerization heat with ordinary cooling water and a special cooling facility is required. Further, the polymerization activity decreases unfavorably to a great extent.

The process of this invention can be put to practice by using the combination of polymerization vessels as mentioned in (1) and (2) above. In the case of (1), the slurry cannot be discharged from the continuous polymerization vessels while polymerization is carried out in the batch-wise polymerization vessels, and consequently the quantity of slurry in the continuous polymerization vessels changes. This makes it necessary to control accurately the temperature and the ratios of monomers and additives. The case (2) for combination of polymerization vessels is more preferable from the standpoint of operation, because the slurry can be transferred to one polymerization vessel while batch-wise polymerization is carried out in another polymerization vessel and consequently the above-mentioned control in the continuous polymerization vessels is easy.

The above-mentioned combinations (1) and (2) of polymerization vessels involve such a problem that uncontrolled polymerization might take place when the slurry is charged into and discharged from the batch-wise polymerization vessels. In other words, it is very difficult to keep constant the concentrations of ethylene and molecular weight modifier (e.g., hydrogen) when the slurry is charged and discharged. During the period of slurry transfer, the catalyst activity is lowered so that the uncontrolled polymerization is reduced. In this way, it is possible to improve the properties of the resulting polymer. The embodiments for such catalyst deactivation are described in paragraphs (a) to (d) above.

According to the process of this invention, it is possible to produce a propylene-ethylene copolymer of superior properties efficiently using a small number of polymerization vessels. Therefore, this invention is of great industrial value.

The invention is illustrated in detail by the following examples and comparative examples, wherein: Flow melt index (abbreviated as MI) was measured at 230° C. with a load of 2.16 kg according to ASTM D 1238; Flexural rigidity was measured at 20° C. according to ASTM D 747-63;

Notched Izod impact strength was measured at 20° C. according to ASTM D 256-56;

DuPont impact strength was measured at −10° C. according to JIS K 6718;

Intrinsic viscosity (abbreviated as $\eta$) was measured for tetralin solutions at 135° C.; and Isotactic index (abbreviated as II) was calculated from (Residues after extraction with boiling n-heptane)/(Total polymer) (%).

EXAMPLE 1

(i) Preparation of solid catalyst

Into a 4-liter grinding pot containing 9 kg of steel balls 12 mm in diameter were charged under a nitrogen atmosphere 300 g of magnesium chloride, 60 ml of tetraethoxysilane, and 45 ml of $\alpha,\alpha,\alpha$-trichlorotoluene. Grinding was carried out for 40 hours on a vibration mill on which four grinding pots were placed. Into a 50-liter autoclave were charged 3 kg of the ground product and 20 l of titanium tetrachloride. After stirring at 80° C. for 2 hours, the supernatant liquid was removed by decantation. Then, 35 l of n-heptane was added, and the supernatant liquid was removed by decantation after stirring at 80° C. for 15 minutes. This washing step was repeated seven times. Finally, 20 l of n-hetane was added to make solid catalyst slurry. Analysis after evaporation of n-heptane indicated that the solid catalyst contains 1.4 wt % of Ti.

(ii) Polymerization

Polyermization was carried out using the polymerization equipment as shown in FIG. 1.

Into a 50-liter autoclave replaced with completely dry nitrogen were charged 30 l of n-heptane, 50 g of the aforesaid solid catalyst, 240 ml of diethylaluminum chloride, and 140 ml of methyl p-toluylate. The contents were stirred at 25° C. to make a catalyst slurry mixture.

Into a 300-liter autoclave A replaced with completely dry nitrogen and then with propylene gas was charged 60 kg of propylene. Polymerization was started at 75° C. while charging into the autoclave through separate feed ports the aforesaid slurry mixture at a rate of 1 g/h as solid catalyst, triethylaluminum at a rate of 4 ml/h, and liquid propylene at a rate of 30 kg/h, and while discharging continuously polypropylene from the bottom of the autoclave at a rate of 30 kg/h. Hydrogen was charged so that the concentration of hydrogen in the gas phase was 6.5 vol %. When polymerization became stable 6 hours after the start of polymerization, a small quantity of slurry was extracted for measurement of properties of powder. The slurry which was being discharged from the bottom of the autoclave A was charged into a 200-liter autoclave C which had been replaced with completely dry nitrogen and further with propylene gas. The slurry was discharged at a rate of 180 kg/h for 5 minutes. In the period from the transfer of slurry to autoclave C to the subsequent transfer of slurry, slurry was not discharged from the autoclave A, but propylene, catalyst slurry mixture, and triethylaluminum were charged at the same rate as before. Therefore, the quantity of propylene slurry in the autoclave A varied in the range from 47.5 kg to 60 kg.

The continuous polymerization vessel was being operated at intervals of 2 hours of the average dwell time (Quantity of slurry in polymerization vessel)/(Quantity of slurry charged or discharged per hour). When the batch-wise polymerization was started, the slurry was discharged all at once in a short time to the following polymerization vessel, with the result that the quantity of slurry in the preceding polymerization vessel was decreased. Due to the difference of charging at 30 kg/h and discharging at 180 kg/h, the quantity of slurry decreased to 47.5 kg until the discharge of slurry into the batch-wise polymerization vessel was completed. So long as polymerization was carried out in the batch-wise polymerization vessel, the slurry was not discharged. Therefore, the quantity of the slurry increased from 47.5 kg to 60 kg in 25 minutes until the next discharge was made. In this manner the discharge of the slurry to the batch-wise polymerization vessel was repeated.

In the autoclave C, 5 kg of liquid propylene was forced in while purging the gas phase, keeping the temperature at 50° C. and the hydrogen concentration at 0.3 vol %. Further, ethylene and hydrogen were charged so that the hydrogen concentration and ethylene concentration in the gas phase were kept at 0.60 vol % and 35.0 mol %, respectively, and polymerization was carried out at 50° C. for 7.5 minutes. Then, ethylene was added all at once so that polymerization was carried out for 1.5 minutes at the hydrogen concentration of 0.55 vol % and the ethylene concentration of 40.0 mol %. The contents of the autoclave C were transferred all at once to the 200-liter autoclave D, which had previously been replaced with dry nitrogen and further with propylene, containing 10 kg of liquid propylene and 50 ml of isopropanol, in order to deactivate the catalyst.

The autoclave C was washed with liquid propylene and the washing liquid was discharged to the autoclave D. The autoclave C was allowed to stand at a pressure of about 3 kg/cm$^2$G until the subsequent slurry was charged. On the other hand, the slurry in the autoclave D was transferred to the flush tank E, and then powder was discharged through the hopper F. After discharge, the autoclave D was charged with 10 kg of liquid propylene and 50 ml of isopropanol, and allowed to stand until the subsequent charging. By repeating the above steps, copolymerization was carried out batch-wise. The step in the autoclave C took about 25 minutes before it became ready for the subsequent charge after the charge of slurry. By charging slurry every 30 minutes, the steps in the autoclave C were repeated 50 times and polymerization was carried out for 25 hours. As the result, about 250 kg of propylene-ethylene block copolymer was obtained. In 25 hours, operation was continued without any trouble such as pipe clogging. The content of Ti in the product indicated that the polymerization per unit weight of solid catalyst was 11800 g/g solid catalyst.

The resulting block copolymer was dried at 60° C., 100 mm Hg, for 10 hours, and incorporated with commonly used additives, followed by pelletization. Physical properties were measured for the pellets thus obtained. Results are shown in Table 2.

Figure 2:
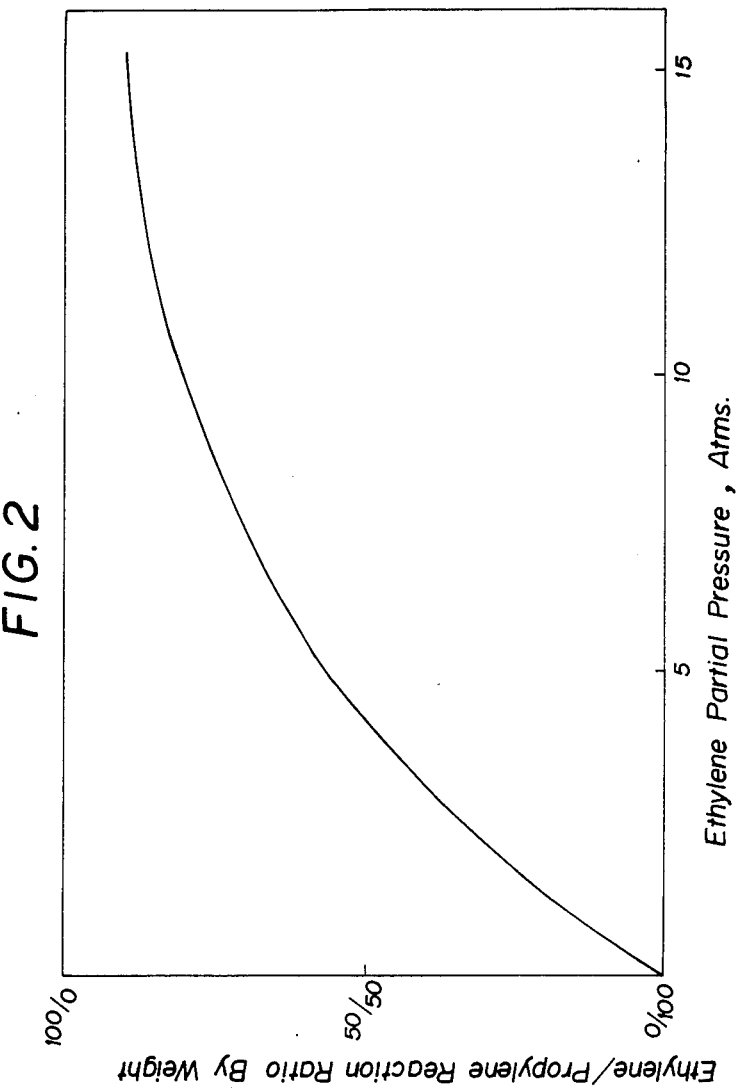
FIG. 2 is a graph showing the relation between the ethylene/propylene reaction ratio (by weight) and the ethylene partial pressure (atm).

FIG. 2 shows the relation between the ethylene/propylene reaction ratio (by weight) and the ethylene partial pressure (atm). This shows the results of the model experiment at 50° C. using the catalyst used in Example 1. From this graph, it is possible to estimate the ethylene/propylene reaction ratio corresponding to the ethylene concentration in each stage of batch-wise polymerization shown in Table 1.

EXAMPLE 2

Polymerization in Example 1 was repeated using the catalyst obtained in step (i) of Example 1, except that the hydrogen concentrations were changed as shown in Table 1. Polymerization was carried out without any trouble for 25 hours.

COMPARATIVE EXAMPLE 1

Polymerization was carried out as in Example 1, except that ground $TiCl_3.1/3AlCl_3$ [AA type catalyst (TAC) made by Toho Titanium Co., Ltd.] was charged at a rate of 2 g/h, diethylaluminum chloride was charged at a rate of 8 ml/h, and propylene was charged at a rate of 15 kg/h. The temperature was 70° C. and the cycle of batch-wise polymerization was 6.0 minutes. The hydrogen concentrations and ethylene concentrations and the polymerization time in each stage are as shown in Table 1. When batch-wise polymerization was carried out three times, the hopper F was clogged with powder. The clogging polymer was washed out of the flush tank E and hopper F with n-heptane and discharged in the form of slurry. Then, polymerization was continued, but was forced to suspend because powder clogging occurred when batch-wise polymerization was carried out twice. The polymer discharged in the form of powder in this cycle was treated and measured for physical properties as in Example 1. Results are shown in Table 2. The polymerization activity per unit weight of solid catalyst was estimated from the content of Ti in the powder. Pellet produced from the powder was yellowish.

COMPARATIVE EXAMPLE 2

Polymerization was carried out as in Example 1, except that the polymerization temperature in the autoclave A was 50° C., propylene was charged at a rate of 17 kg/h, and the hydrogen and ethylene concentrations were as shown in Table 1. After batch-wise polymerization was carried out 5 times, the powder ceased to be discharged from the hopper F. Hence, polymerization was suspended. The powder obtained in this cycle was treated and measured for physical properties as in Example 1. The polymerization activity per unit weight of solid catalyst was estimated from the content of Ti in the powder.

COMPARATIVE EXAMPLE 3

Polymerization was carried out as in Example 1, except that the polymerization temperature in the autoclave C was 70° C. and the hydrogen and ethylene concentrations were as shown in Table 1. After batch-wise polymerization was carried out 4 times, the powder ceased to be discharged from the hopper F. Hence, polymerization was suspended. The powder obtained in this cycle was treated and measured for physical properties as in Example 1. Results are shown in Table 2.

EXAMPLE 3

Polymerization was carried out using a polymerization apparatus in which the 300-liter autoclave G (not shown) is installed between the autoclave A and autoclave C as shown in FIG. 1. When polymerization was started in the autoclave A, the autoclave G was charged with triethylaluminum at a rate of 1.5 ml/h and 60 kg of propylene. At the same time when polypropylene slurry was charged continuously from the autoclave A at a rate of 30 kg/h, triethylaluminum was charged at a rate of 3.0 ml/h. Slurry was discharged form the autoclave G to the autoclave C in the same way slurry was discharged from the autoclave A to the autoclave C in Example 1. With the exceptions mentioned above, polymerization was carried out as in Example 1. It was possible to carry out polymerization continuously for 25 hours without any trouble. The resulting product was found to have good properteis. Incidentally, the discharge of slurry from the autoclave A to the autoclave G was accomplished by a common slurry pump.

EXAMPLE 4

Polymerization was carried out using a polymerization apparatus in which the 30-liter autoclave H (not shown) is installed before the autoclave A as shown in FIG. 1. The catalyst slurry as used in Example 1 was charged at a rate of 1 g/h in terms of solid catalyst. Triethylaluminum and liquid propylene were charged continuously at rates of 0.8 ml/h and 29.2 kg/h, respectively, through separate feed ports. Slurry was transferred at a rate of 29.2 kg/h from the autoclave H to the autoclave A charged with 60 kg of propylene. The autoclave A was further fed with propylene at a rate of 0.8 kg/h, ethylene at a rate of 160 g/h, and triethylaluminum at a rate of 4 ml/h. Continuous polymerization was carried out under the conditions as shown in Table 1. As in Example 1, slurry was transferred from the autoclave A to the autoclave C, and batch-wise polymerization was performed under the conditions as shown in Table 1. It was possible to carry out polymerization continuously for 20 hours without any trouble.

The resulting product was found to have extremely good transparency, with a slight decrease in rigidity and impact strength. The light transmittance for a 1 mm thick pressed sheet was 82%, which was compared with 70% for the copolymer obtained in Example 1.

TABLE 1

Polymerization Conditions

| | Continuous Polymerization | | | | | Batch-wise Polymerization | | | | | | | | | |
|---|---|---|---|---|---|---|---|---|---|---|---|---|---|---|---|
| | | | | | | First Stage | | | | | Second Stage | | | | |
| Example No. | Temperature °C. | Pressure kg/cm²G | Ave. dwell time min** | Hydrogen conc. vol % | Ethylene conc. mol % | Temperature °C. | Pressure kg/cm²G | Time min | Hydrogen conc. vol % | Ethylene conc. mol % | Temperature °C. | Pressure kg/cm²G | Time min | Hydrogen conc. vol % | Ethylene conc. mol % |
| Ex. No. 1 | 75 | 32 | 120 | 6.5 | — | 50 | 30.0 | 7.5 | 0.60 | 35.0 | 50 | 33.5 | 1.5 | 0.55 | 40.0 |
| Ex. No. 2 | 75 | 31 | 120 | 3.2 | — | 50 | 30.0 | 12.0 | 0.25 | 35.0 | 50 | 34.5 | 3.0 | 0.20 | 41.5 |
| Ex.* No. 3 | A75 G75 | A31 G31 | A120 G120 | A6.0 G7.2 | — | 50 | 30.0 | 9.0 | 0.60 | 35.0 | 50 | 33.5 | 2.0 | 0.55 | 40.5 |
| Ex.* No. 4 | H75 A75 | H31 A31 | H9.6 A120 | H3.8 A3.2 | H0 A0.9 | 50 | 30.0 | 4.5 | 0.70 | 35.0 | 50 | 38.5 | 6.0 | 0.55 | 51.5 |
| Com. Ex. No. 1 | 70 | 28 | 240 | 20.1 | — | 50 | 30.5 | 20.0 | 1.2 | 35.5 | 50 | 33.5 | 6.0 | 1.0 | 39.8 |
| Com. Ex. No. 2 | 50 | 20 | 211 | 10.8 | — | 50 | 29.5 | 7.5 | 0.60 | 35.0 | 50 | 32.5 | 1.5 | 0.55 | 37.5 |
| Com. Ex. No. 3 | 75 | 32 | 120 | 6.5 | — | 70 | 38.0 | 4.0 | 0.40 | 32.0 | 70 | 41.0 | 1 | 0.30 | 41.5 |

Remarks:
*A, G, and H represent the type of autoclave for polymerization.
**Average value of (quantity of slurry in polymerization vessel)/(quantity of slurry charged to or discharged from polymerizatin vessel per hour)

TABLE 2

Physical Properties

| | Powder after continuous polymerization | | Powder of final product | | | Sheet of final product | | | | | | | |
|---|---|---|---|---|---|---|---|---|---|---|---|---|---|
| | | | | | | Bulk density | MI | Ethylene content | Flexural rigidity | DuPont Impact kg·cm/φ½" | | Izod Impact kg·cm/cm | |
| Example No. | η | II % | Yield* | η | II % | g/ml | g/10 min | % | kg/cm² | 20° C. | −10° C. | 20° C. | −10° C. |
| Ex. No. 1 | 1.40 | 96.0 | 11800 | 2.01 | 90.3 | 0.34 | 7.60 | 10.5 | 10900 | 60 | 40 | 6.5 | 3.4 |
| Ex. No. 2 | 1.73 | 96.9 | 11900 | 2.95 | 88.0 | 0.32 | 2.05 | 14.4 | 9800 | 295 | 65 | ** | 7.0 |
| Ex. No. 3 | 1.40 | 95.8 | 12400 | 2.05 | 90.0 | 0.34 | 7.50 | 10.8 | 10900 | 70 | 45 | 7.4 | 4.0 |
| Ex. No. 4 | 2.12 | 92.5 | 12300 | 2.15 | 81.3 | 0.30 | 1.7 | 22.5 | 7800 | 120 | 50 | 8.8 | 6.0 |
| Com. Ex. No. 1 | 1.38 | 90.0 | 3500 | 2.10 | 80.0 | 0.30 | 7.50 | 10.4 | 6300 | 69 | 30 | 6.5 | 3.0 |
| Com. Ex. No. 2 | 1.40 | 92.8 | 10900 | 2.10 | 76.5 | 0.25 | 7.55 | 10.9 | 6000 | 65 | 30 | 6.5 | 3.5 |
| Com. Ex. No. 3 | 1.41 | 96.0 | 12000 | 2.00 | 87.5 | 0.18 | 7.50 | 10.5 | 8900 | 60 | 30 | 6.5 | 3.0 |

Remarks:
*Polymerization activity expressed in yield g/g-solid catalyst
**Not broken

EXAMPLE 5

Figure 3:
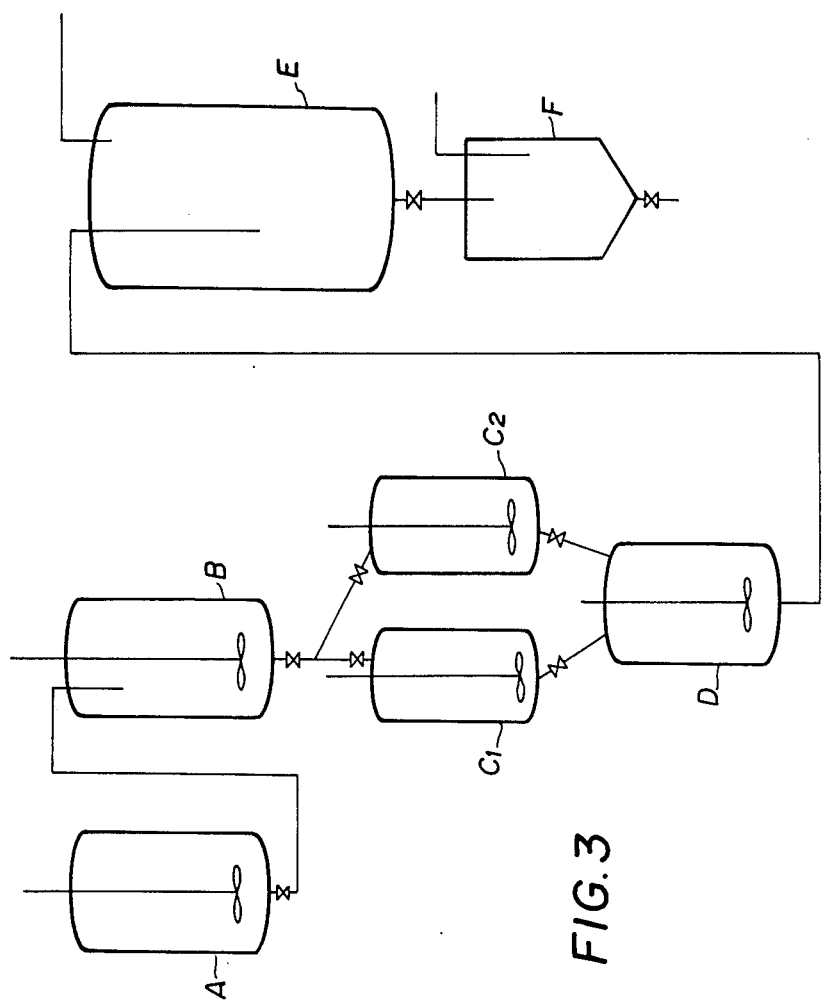
FIG. 3 is a schematic illustration showing an example of the polymerization equipment used for Examples 5 to 19, wherein:
- A and B: Autoclaves for continuous polymerization,
- C1 and C2: autoclaves for batch-wise polymerization,
- D: Autoclave for deactivation of catalyst,
- E: Flush tank, and
- F: Hopper, and C1 and C2 are placed higher than D, and B is placed higher than C1 and C2.
Figure 4:
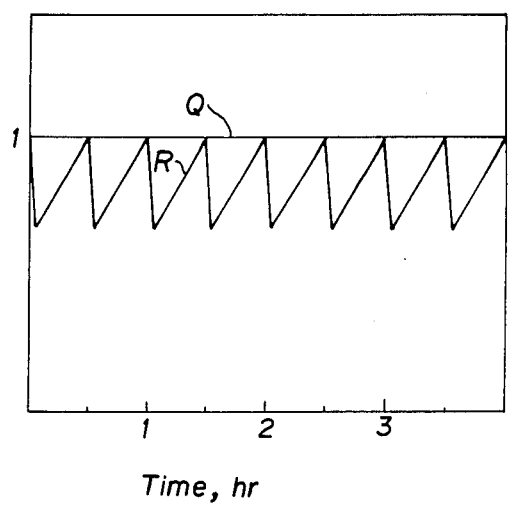
FIG. 4 is a graph showing the relation between the level (represented in relative values) of the slurry quantity in the continuous polymerization vessel and the elapsed time, wherein the straight line Q represents the results in Examples 5, 6, and 7, and the polygonal line R represents the result in the case where the two polymerization vessels connected in parellel to the final polymerization vessel are not employed.

Polymerization was carried out using the polymerization equipment as shown in FIG. 3.

Into a 50-liter autoclave replaced with completely dry nitrogen were charged 30 l of n-heptane, 50 g of the solid catalyst obtained in Example 1, 240 ml of diethylaluminum chloride, and 140 ml of methyl p-toluylate. The contents were stirred at 25° C. to make a catalyst slurry mixture.

Two 300-liter autoclaves A and B replaced with completely dry nitrogen and then with propylene gas were connected in series. Two 200-liter autoclaves C1 and C2 were connected in parallel thereafter. The autoclaves A and B were charged with 60 kg of propylene. Polymerization was started at 75° C. while charging into the autoclave A through separate feed ports the aforesaid catalyst slurry mixture at a rate of 1 g/h as solid catalyst, triethylaluminum at a rate of 1.5 ml/h, and liquid propylene at a rate of 30 kg/h, and charging into the autoclave B triethylaluminum at a rate of 3.0 ml and polypropylene from the autoclave A at a rate of 30 kg/h, and while disdharging continuously polypropylene from the bottom of the autoclave B at a rate of 30 kg/h. Hydrogen was charged so that the concentration of hydrogen in the gas phase in the autoclaves A and B was kept as shown in Table 1. When polymerization became stable 6 hours after the start of polymerization, a small quantity of slurry was extracted from the autoclave B for measurement of properties of powder. The slurry which was being discharged continuously from the bottom of the autoclave was transferred into the autoclave C1. After transfer for 30 minutes, the destination of transfer was switched from C1 to C2. On completion of reception of slurry from C1, C1 was charged under pressure with 5 kg of liquid propylene while purging the gas phase. The temperature in the autoclave was adjusted to 50° C. and the hydrogen concentration was adjusted to 0.3 vol %. Further, ethylene and hydrogen were charged and polymerization was carried out at 50° C. for 7.5 minutes with the hydrogen and ethylene concentrations at 0.60 vol % and 35.0 mol %, respectively. Ethylene was further added, and polymerization was carried out for 1.5 minutes with the hydrogen and ethylene concentrations at 0.55 vol % and 40.0 mol %, respectively. Then, the reactants were transferred under pressure all at once to the autoclave D which had been previously charged with 10 kg of liquid propylene and 50 ml of isopropanol in order to deactivate the catalyst. The autoclave C1 was washed with liquid propylene, and washing propylene was also transferred under pressure to the autoclave D. The autoclave C1 was made ready for the subsequent reception of slurry at about 3 kg/cm$^2$G. On the other hand, while the autoclave D was charged with isopropanol at a rate of 1 ml/h, the polypropylene was discharged from the bottom and transferred to the flush tank E. Finally powder was discharged from the hopper F. Discharge from the autoclave D was accomplished continuously at a rate of 40 kg/h, so that about 10 kg of polypropylene slurry remained in the autoclave D when slurry was received from the autoclave C2. After reception of slurry from the autoclave B, copolymerization was carried out in the autoclave C2 in the same way as copolymerization in C1. Thus, copolymerization operation (including adjustment of hydrogen concentration, copolymerization, discharge of slurry, and washing of polymerization vessel) was carried out alternately in C1 and C2. When C1 was in use, C2 received slurry, and when C2 was in use, C1 received slurry. It took about 20 minutes for C1 and C2 to complete the step from the end of reception of slurry to the end of discharge of slurry. Batch-wise polymerization was carried out at a cycle consisting of 30 minutes from the end of reception of slurry to the start of subsequent reception of slurry, 30 minutes from the start of reception of slurry to the end of reception of slurry, 25 minutes for copolymerization operation (including adjustment of hydrogen concentration, copolymerization, discharge of slurry, and washing of polymerization vessel), and 5 minutes for waiting. Such alternate batch-wise polymerization permitted continuous production of a block copolymer. By operating the autoclaves C1 and C2 25 times each, or 50 times in total, about 250 kg of propylene-ethylene block copolymer was obtained as the product. Operation was continued for 25 hours without any trouble. From the content of Ti in the product, the polymerization per unit weight of solid catalyst was obtained. The resulting block copolymer was dried at 60° C., 100 mm Hg, for 10 hours, and then pelletized with commonly used additives. Physical properties were measured for the resulting pellets. The results are shown in Table 4. The pellets were white.

EXAMPLE 6

Polymerization was carried out as in Example 5 using the catalyst obtained in step (i) of Example 1, except that the concentrations of hydrogen and ethylene were changed as shown in Table 3. Polymerization operation was continued for 25 hours without any trouble.

EXAMPLE 7

(i) Preparation of Solid Catalyst

The same vibration mill as used in Example 1 was used. Each pot was charged under a nitrogen atmosphere with 300 q of titanium trichloride [(TAC) Type AA, made by Toho Titanium Co., Ltd.)] and 10 ml of diethylaluminum chloride. After grinding for 20 hours, 3 g of ethylene was charged over 30 minutes while continuing grinding. After that, grinding was continued for 2 hours. 3 kg of ground product was charged to a 50-liter autoclave, together with 18 l of n-heptane and 4.2 l of diisoamyl ether. After stirring at 60° C. for 2 hours, the supernatant liquid was removed by decantation, followed by washing three times at 60° C. with 18 l of n-heptane. 18 l of n-heptane and 9 l of titanium tetrachloride were added, followed by stirring for 2 hours. The reaction product was washed five times with n-heptane. Thus, a solid catalyst ingredient was obtained.

(ii) Polymerization

A 50-liter autoclave replaced with completely dry nitrogen was charged with 30 l of n-heptane, 50 g of the aforesaid solid catalyst, and 3 ml of diethylene glycol monoisopropyl ether, followed by stirring at 25° C. for 10 minutes. Further, 500 ml of diethylaluminum chloride was added to make a catalyst slurry. This catalyst slurry was charged at a rate of 1 g/h as solid catalyst into the autoclave A. Polymerization was carried out as in Example 5, except that the hydrogen concentration, the ethylene concentration, and polymerization pressures were adjusted as shown in Table 3. The resulting polymer was pelletized. The results are shown in Table 4. Polymerization operation was continued for 25 hours without any trouble. The pellets were white.

TABLE 3

| | Continuous Polymerization* | | | | | Batch-wise Polymerization | | | | | | | | | |
|---|---|---|---|---|---|---|---|---|---|---|---|---|---|---|---|
| | | | | | | First Stage | | | | | Second Stage | | | | |
| Example No. | Temperature °C. | Pressure kg/cm$^2$G | Ave. dwell time min | Hydrogen conc. vol % | Ethylene conc. mol % | Temperature °C. | Pressure kg/cm$^2$G | Time min | Hydrogen conc. vol % | Ethylene conc. mol % | Temperature °C. | Pressure kg/cm$^2$G | Time min | Hydrogen conc. vol % | Ethylene conc. mol % |
| Ex. No. 5 | A75 B75 | A32 B32 | A120 B120 | A6.5 B6.5 | — | 50 | 30.0 | 7.5 | 0.60 | 35 | 50 | 33.5 | 1.5 | 0.55 | 40.0 |
| Ex. No. 6 | A75 B75 | A32 B31 | A120 B120 | A4.8 B3.0 | — | 50 | 30.0 | 12.0 | 0.25 | 35 | 50 | 34.5 | 3.0 | 0.20 | 41.5 |
| Ex. No. 7 | A75 B75 | A33 B33 | A120 B120 | A16.5 B16.5 | — | 50 | 30.5 | 7.5 | 1.0 | 35 | 50 | 34.0 | 2.0 | 1.0 | 40.0 |

Remarks:
*A and B represent the type of autoclave for polymerization.

TABLE 4

| Example No. | Powder after continuous polymerization η | Powder after continuous polymerization II % | Powder of final product Yield* | Powder of final product η. | Powder of final product II % | Physical Properties — Sheet of final product Bulk density g/ml | MI g/10 min | Ethylene content % | Flexural rigidity kg/cm² | DuPont Impact kg·cm/φ½" 20° C. | DuPont Impact kg·cm/φ½" −10° C. | Izod Impact kg·cm/cm 20° C. | Izod Impact kg·cm/cm −10° C. |
|---|---|---|---|---|---|---|---|---|---|---|---|---|---|
| Ex. No. 5 | 1.42 | 96.0 | 12800 | 2.05 | 90.5 | 0.35 | 7.6 | 10.9 | 10900 | 72 | 44 | 7.5 | 4.0 |
| Ex. No. 6 | 1.75 | 96.9 | 12100 | 2.95 | 88.5 | 0.33 | 2.1 | 14.4 | 9800 | 295 | 65 | ** | 7.0 |
| Ex. No. 7 | 1.41 | 95.6 | 9800 | 2.10 | 89.0 | 0.36 | 7.2 | 10.6 | 10100 | 68 | 42 | 7.0 | 4.0 |

Remarks:
*Polymerization activity expressed in yield g/g-solid catalyst
**Not broken

EXAMPLE 8

Polymerization was carried out using the polymerization equipment as shown in FIG. 3.

Into a 50-liter autoclave replaced with completely dry nitrogen were charged 30 l of n-heptane, 50 g of the solid catalyst obtained in Example 1, 240 ml of diethylaluminum chloride, and 140 ml of methyl p-toluylate. The contents were stirred at 25° C. to make a catalyst slurry mixture. Two 300-liter autoclaves A and B replaced with completely dry nitrogen and then with propylene gas were connected in series. Two 200-liter autoclaves C1 and C2 were connected in parallel thereafter. A 300-liter autoclave D was connected in series to the autoclaves C1 and C2. The autoclaves A and B were charged with 60 kg of propylene. The autoclave A was charged with the aforesaid catalyst slurry mixture at a rate of 1 g/h as solid catalyst, triethylaluminum at a rate of 1.5 ml/h, and liquid propylene at a rate of 30 kg/h. The autoclave B was charged with triethylaluminum at a rate of 3.0 ml and polypropylene slurry continuously from the autoclave A at a rate of 30 kg/h. Simultaneously with charging, polypropylene slurry was discharged continuously from the bottom of the autoclave B at a rate of 30 kg/h. Hydrogen was charged so that the concentration of hydrogen in the gas phase in the autoclaves A and B was kept as shown in Table 5. Under these conditions, polymerization was carried out at 75° C., and when polymerization became stable 6 hours after the start of polymerization, a small quantity of slurry was extracted from the autoclave B for measurement of properties of powder. The slurry which was being discharged continuously from the bottom of the autoclave B and methyl p-toluylate at a rate of 0.8 ml/30 min were charged into the autoclave C1. The activity was reduced to about 2/5. After the transfer of slurry into C1 for 30 minutes, the destination of transfer of slurry from the autoclave B and methyl p-toluylate was switched from autoclave C1 to autoclave C2. In the autoclave C1, simultaneously with the reception of slurry, 5 kg of liquid propylene was charged under pressure while purging the gas phase part, and the temperature in the autoclave was kept at 50° C. and the hydrogen concentration was adjusted to 0.3 vol %. Further, ethylene and hydrogen were charged and polymerization was carried out at 50° C. for 12 minutes with the hydrogen and ethylene concentrations at 0.60 vol % and 35.0 mol %, respectively. Ethylene has further added, and polymerization was carried out for 2.5 minutes with the hydrogen and ethylene concentrations at 0.55 vol % and 40.0 mol %, respectively. Then, 20 ml of methyl p-toluylate was charged to decrease the activity to about ⅓. The reactants were transferred under pressure over 7 minutes to the autoclave D which had previously been charged with 10 kg of liquid propylene and 50 ml of isopropanol. The autoclave C1 was washed with liquid propylene, and washing propylene was also transferred to the autoclave D. The autoclave C1 was made ready for the subsequent reception of slurry at about 3 kg/cm²G. On the other hand, while the autoclave D was charged with isopropanol at a rate of 1 ml/h, the slurry was discharged from the bottom and transferred to the flush tank E. Finally powder was discharged from the hopper F. Discharge from the autoclave D was accomplished continuously at a rate of 40 kg/h, so that about 10 kg of slurry remained in the autoclave D when slurry was received from the autoclave C2. In the autoclave C2, copolymerization was carried out as in the autoclave C1 after charging of slurry from the autoclave B and methyl p-toluylate over 30 minutes. Batch-wise polymerization was repeated 25 times each, 50 times in total, in the autoclaves C1 and C2. About 250 kg of propylene-ethylene block copolymer was obtained as the product. The above-mentioned polymerization operation was continued without any trouble. The polymerization per unit weight of the solid catalyst was obtained from the content of Ti in the product. The resulting block copolymer was dried at 60° C., 100 mm Hg, for 10 hours, followed by pelletizing with commonly used additives. Physical properties were measured for the pellets. Results are shown in Table 6.

REFERENTIAL EXAMPLE

Figure 5:
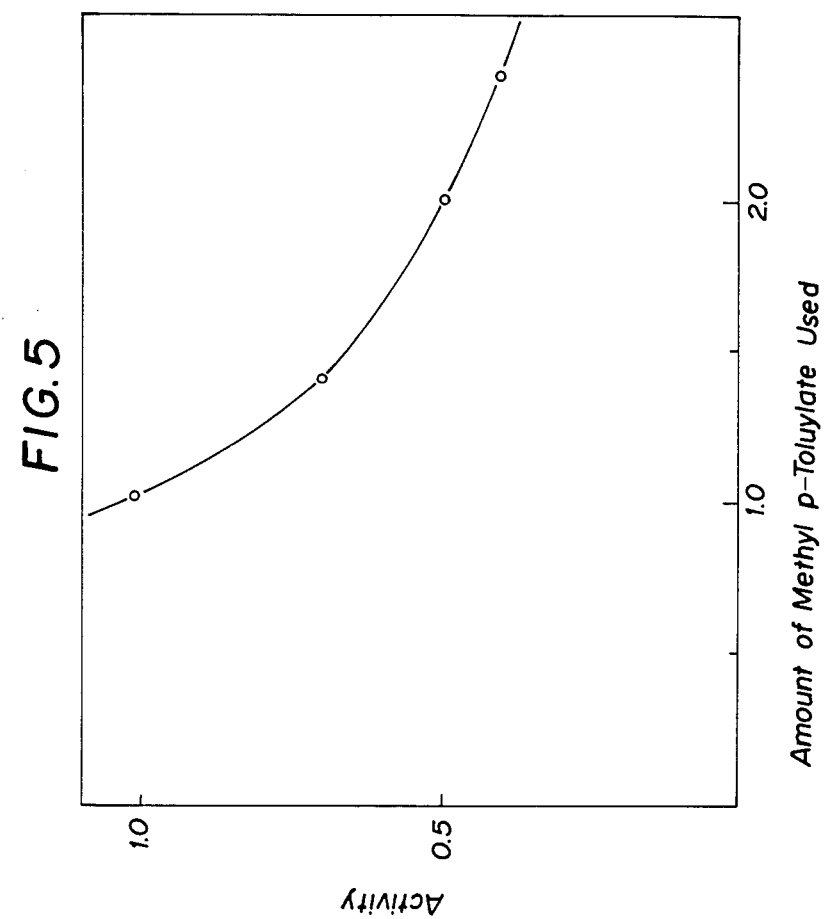
FIG. 5 is a graph showing the relation between the catalyst activity and the quantity of methyl p-toluylate used as a deactivator for catalyst.

In polymerization using the catalyst prepared in step (i) of Example 1, and diethylaluminum chloride and triethylaluminum at a fixed ratio, the quantity of methyl p-toluylate was changed. The relation between the activity and the quantity of methyl p-toluylate is shown in FIG. 5. From this relation, it is possible to estimate the quantity of methyl p-toluylate to be added to achieve the desired activity.

EXAMPLE 9

Polymerization was carried out using the apparatus as shown in FIG. 3 in the same manner as in Example 8 with the following exceptions. Instead of adding methyl p-toluylate at a rate of 0.3 ml/30 min, tetraethoxysilane was added at a rate of 1.0 ml/30 min when the slurry was transferred to the autoclaves C1 and C2, so that the activity was decreased to about 2/5. In addition, instead of adding 2.0 ml of methyl p-toluylate, 2.0 ml of tetraethoxysilane was added on completion of the batch-wise polymerization in the autoclave C1, so that the activity was decreased to about ⅓. The results are shown in Table 6.

EXAMPLE 10

Polymerization was carried out as in Example 8 with the following exceptions. Instead of adding methyl p-toluylate at a rate of 0.3 ml/30 min, methyl orthoacetate was added at a rate of 0.45 ml/30 min when the slurry was transferred to the autoclaves C1 and C2, so that the activity was decreased to about 2/5. In addition, instead of adding 1 ml of methyl p-toluylate, 1 ml of diethylene glycol monoisopropyl ether was added on completion of the batch-wise polymerization in the autoclaves C1 and C2, so that the activity was decreased to about ¼. The results are shown in Table 6.

C., and when polymerization became stable 6 hours after the start of polymerization, a small quantity of slurry was extracted from the autoclave B for measurement of properties of powder. The slurry which was being discharged continuously from the bottom of the autoclave B was transferred together with methyl p-toluylate at a rate of 1.4 ml/30 min into the autoclave C1. After the transfer of slurry into C1 for 30 minutes, the destination of transfer of slurry from the autoclave B and methyl p-toluylate was switched from autoclave C1 to autoclave C2. In the autoclave C1, simultaneously with the reception of slurry, 5 kg of liquid propylene was charged under pressure while purging the gas

TABLE 5

| | Polymerization Conditions | | | | | | | | | | | | | |
|---|---|---|---|---|---|---|---|---|---|---|---|---|---|---|
| | Continuous Polymerization | | | | Batch-wise Polymerization | | | | | | | | | |
| | | | | | First Stage | | | | | Second Stage | | | | |
| Example No. | Temperature °C. | Pressure kg/cm²G | Ave. dwell time min | Hydrogen conc. vol % | Temperature °C. | Pressure kg/cm²G | Time min | Hydrogen conc. vol % | Ethylene conc. mol % | Temperature °C. | Pressure kg/cm²G | Time min | Hydrogen conc. vol % | Ethylene conc. mol % |
| Ex. No. 8 | A75 B75 | A32 B32 | A120 B120 | A6.5 B6.5 | 50 | 30.0 | 12 | 0.60 | 35 | 50 | 33.5 | 2.5 | 0.55 | 40.0 |
| Ex. No. 9 | A75 B75 | A32 B32 | A120 B120 | A6.5 B6.5 | 50 | 30.0 | 12 | 0.60 | 35 | 50 | 33.5 | 2.5 | 0.55 | 40.0 |
| Ex. No. 10 | A75 B75 | A32 A32 | A120 B120 | A6.5 B6.5 | 50 | 30.0 | 12 | 0.60 | 35 | 50 | 33.5 | 2.5 | 0.55 | 40.0 |

TABLE 6

| | Physical Properties | | | | | | | | | | | |
|---|---|---|---|---|---|---|---|---|---|---|---|---|
| | Powder after continuous polymerization | | Powder of final product | | | Sheet of final product | | | | | | |
| | | | | | | Bulk density g/ml | MI g/10 min | Ethylene content % | Flexural rigidity kg/cm² | DuPont Impact kg·cm/φ¼" | | Izod Impact kg·cm/cm | |
| Example No. | η | II % | Yield* | η | II % | | | | | 20° C. | −10° C. | 20° C. | −10° C. |
| Ex. No. 8 | 1.42 | 96.0 | 12800 | 2.06 | 91.2 | 0.36 | 7.5 | 9.6 | 11800 | 73 | 44 | 8.0 | 4.0 |
| Ex. No. 9 | 1.41 | 96.1 | 13100 | 2.01 | 91.5 | 0.35 | 7.8 | 10.0 | 11200 | 74 | 45 | 8.2 | 4.1 |
| Ex. No. 10 | 1.41 | 95.0 | 12900 | 2.10 | 90.6 | 0.35 | 7.3 | 9.8 | 12000 | 73 | 44 | 8.0 | 4.0 |

Remarks:
*Polymerization activity expressed in yield g/g-solid catalyst

EXAMPLE 11

Polymerization was carried out using the polymerization equipment as shown in FIG. 3. Into a 50-liter autoclave replaced with completely dry nitrogen were charged 30 l of n-heptane, 50 g of the solid catalyst obtained in step (i) of Example 1, 240 ml of diethylaluminum chloride, and 140 ml of methyl p-toluylate. The contents were stirred at 25° C. to make a catalyst slurry mixture. Two 300-liter autoclaves A and B replaced with completely dry nitrogen and then with propylene gas were connected in series. Two 200-liter autoclaves C1 and C2 were connected in parallel thereafter. A 300-liter autoclave D was connected in series to the autoclaves C1 and C2. The autoclaves A and B were charged with 60 kg of propylene. The autoclave A was charged with the aforesaid catalyst slurry mixture at a rate of 1 g/h as solid catalyst, triethylaluminum at a rate of 1.5 ml/h, and liquid propylene at a rate of 30 kg/h. The autoclave B was charged with triethylaluminum at a rate of 3.0 ml/h and polypropylene slurry continuously from the autoclave A at a rate of 30 kg/h. Simultaneously with charging, polypropylene was discharged continuously from the bottom of the autoclave B at a rate of 30 kg/h. Hydrogen was charged so that the concentration of hydrogen in the gas phase in the autoclaves A and B was kept as shown in Table 7. Under these conditions, polymerization was carried out at 75° phase part, and the temperature in the autoclave was kept at 50° C. and the hydrogen concentration was adjusted to 0.3 vol %. In these steps, the activity was decreased to about 1/5 due to the charging of methyl p-toluylate. Further, ethylene and hydrogen were charged and polymerization was carried out with the hydrogen and ethylene concentrations at 0.55 vol % and 35.0 mol %, respectively. To start batch-wise polymerization, 3.0 ml of triethylaluminum was added under pressure all at once and the activity was increased about 2.5 times. While keeping the hydrogen and ethylene concentrations as mentioned above, polymerization was carried out at 50° C. for 9 minutes. Further, ethylene was added and polymerization was carried out for 2.0 minutes with the hydrogen and ethylene concentrations at 0.55 vol % and 40.0 mol %, respectively. Then, the slurry were transferred under pressure over 3 minutes to the autoclave D which had previously been charged with 10 kg of liquid propylene and 50 ml of isopropanol. The autoclave C1 was washed with liquid propylene, and washing propylene was also transferred to the autoclave D. The autoclave C1 was made ready for the subsequent reception of slurry at about 3 kg/cm²G. On the other hand, while the autoclave D was charged with isopropanol at a rate of 1 ml/h, the slurry was discharged from the bottom and transferred to the flush tank E. Finally powder was discharged from the hopper F. Discharge from the autoclave D was accomplished continuously at a rate of 40 kg/h, so that about 10 kg of slurry remained in the autoclave D when slurry was received from the autoclave C2. In the autoclave C2, copolymerization was carried out as in the autoclave C1 after charging of slurry from the autoclave B and methyl p-toluylate over 30 minutes. Batch wise polymerization was repeated 25 times each, 50 times in total, in the autoclaves C1 and C2. After continuous polymerization for 25 hours, about 250 kg of propylene-ethylene block copolymer was obtained as the product. The above-mentioned polymerization operation was continued without any trouble. The polymerization per unit weight of the solid catalyst was obtained from the content of Ti in the product. The resulting block copolymer was dried at 60° C., 100 mm Hg, for 10 hours, followed by pelletization with commonly used additives. Physical properties were measured for the pellets. Results are shown in Table 8.

REFERENTIAL EXAMPLE

In polymerization using the solid catalyst, diethylaluminum chloride, and methyl p-toluylate at a fixed ratio, the quantity of triethylaluminum was changed. The relation between the activity and the quantity of triethylaluminum is shown in FIG. 6. From FIG. 5 and FIG. 6, it is possible to estimate the quantity of methyl p-toluylate and triethylaluminum to be added to achieve the desired activity.

EXAMPLE 12

Polymerization was carried out using the apparatus as in Example 11 with the following exceptions. Instead of adding methyl p-toluylate at a rate of 0.6 ml/30 min, tetraethoxysilane was added at a rate of 2.0 ml/30 min when the slurry was transferred to the autoclaves C1 and C2, so that the activity was decreased to about 1/5. In addition, the triethylaluminum to be added at the start of batch-wise polymerization in the autoclaves C1 and C2 was changed to 2 ml so that the activity was increased about 2.5 times. The results are shown in Table 8.

EXAMPLE 13

Polymerization was carried out as in Example 11 with the following exceptions. Instead of adding methyl ptoluylate at a rate of 1.4 ml/30 min, methyl orthoacetate was added at a rate of 0.9 ml/30 min when the slurry was transferred to the autoclaves C1 and C2, so that the activity was decreased to about ¼. In addition, the triethylaluminum to be added at the start of batch-wise polymerization in the autoclaves C1 and C2 was changed to 25 ml so that the activity was increased about 2.0 times. The results are shown in Table 8.

TABLE 7

| | Polymerization Conditions | | | | | | | | | | | | | |
|---|---|---|---|---|---|---|---|---|---|---|---|---|---|---|
| | Continuous Polymerization | | | | Batch-wise Polymerization | | | | | | | | | |
| | | | | | First Stage | | | | | Second Stage | | | | |
| Example No. | Temperature °C. | Pressure kg/cm²G | Ave. dwell time min | Hydrogen conc. vol % | Temperature °C. | Pressure kg/cm²G | Time min | Hydrogen conc. vol % | Ethylene conc. mol % | Temperature °C. | Pressure kg/cm²G | Time min | Hydrogen conc. vol % | Ethylene conc. mol % |
| Ex. No. 11 | A75 B75 | A32 B32 | A120 B120 | A6.5 B6.5 | 50 | 30.0 | 9 | 0.55 | 35 | 50 | 33.5 | 2.0 | 0.50 | 40.0 |
| Ex. No. 12 | A75 B75 | A32 B32 | A120 B120 | A6.5 B6.5 | 50 | 30.0 | 10 | 0.55 | 35 | 50 | 33.5 | 2.5 | 0.50 | 40.0 |
| Ex. No. 13 | A75 B75 | A32 B32 | A120 B120 | A6.5 B6.5 | 50 | 30.0 | 10 | 0.55 | 35 | 50 | 33.5 | 2.5 | 0.50 | 40.0 |

TABLE 8

| | Physical Properties | | | | | | | | | | | | |
|---|---|---|---|---|---|---|---|---|---|---|---|---|---|
| | Powder after continuous polymerization | | Powder of final product | | | Sheet of final product | | | | | | | |
| Example No. | η | II % | Yield* | η | II % | Bulk density g/ml | MI g/10 min | Ethylene content % | Flexural rigidity kg/cm² | DuPont Impact kg·cm/φ½" 20° C. | DuPont Impact −10° C. | Izod Impact kg·cm/cm 20° C. | Izod Impact −10° C. |
| Ex. No. 11 | 1.41 | 96.0 | 12000 | 2.05 | 92.0 | 0.36 | 7.5 | 8.0 | 11800 | 76 | 46 | 8.5 | 4.0 |
| Ex. No. 12 | 1.42 | 96.1 | 12800 | 2.05 | 92.1 | 0.36 | 7.8 | 7.9 | 12100 | 76 | 45 | 8.5 | 4.0 |
| Ex. No. 13 | 1.40 | 96.0 | 13100 | 2.06 | 92.2 | 0.36 | 7.5 | 7.9 | 11900 | 77 | 45 | 8.2 | 4.0 |

Remarks:
*Polymerization activity expressed in yield g/g-solid catalyst

EXAMPLE 14

Polymerization was carried out using the polymerization equipment as shown in FIG. 3. Into a 50-liter autoclave replaced with completely dry nitrogen were charged 30 l of n-heptane, 50 g of the solid catalyst obtained in step (i) of Example 1, 240 ml of diethylaluminum chloride, and 140 ml of methyl p-toluylate. The contents were stirred at 25° C. to make a catalyst slurry mixture. Two 300-liter autoclaves A and B replaced with completely dry nitrogen and then with propylene gas were connected in series. Two 200-liter autoclaves C1 and C2 were connected in parallel thereafter. A 300-liter autoclave D was connected in series to the autoclaves C1 and C2. The autoclaves A and B were charged with 60 kg of propylene. The autoclave A was charged with the aforesaid catalyst slurry mixture at a rate of 1 g/h as solid catalyst, triethylaluminum at a rate of 1.5 ml/h, and liquid propylene at a rate of 30 kg/h. The autoclave B was charged with triethylaluminum at a rate of 3.0 ml and polypropylene slurry continuously from the autoclave A at a rate of 30 kg/h. Simultaneously with charging, polypropylene slurry was discharged continuously from the autoclave B at a rate of 30 kg/h. Hydrogen was charged so that the concentration of hydrogen in the gas phase in the autoclaves A and B was kept as shown in Table 9. Under these conditions, polymerization was carried out at 75° C., and when polymerization became stable 6 hours after the start of polymerization, a small quantity of slurry was extracted from the autoclave B for measurement of properties of the powder. The slurry which was being discharged continuously from the bottom of the autoclave B was transferred together with methyl p-toluylate at a rate of 0.8 ml/30 min into the autoclave C1. The activity was decreased to about 2/5. After the transfer of slurry into autoclave C1 for 30 minutes, the destination of transfer of slurry from the autoclave B and methyl p-toluylate was switched from autoclave C1 to autoclave C2. In the autoclave C1, simultaneously with the reception of slurry, 5 kg of liquid propylene was charged under pressure while purging the gas phase part, and the temperature in the autoclave was kept at 50° C. and the hydrogen concentration was adjusted to 0.3 vol %. Further, ethylene and hydrogen were charged and polymerization was carried out at 50° C. for 12 minutes with the hydrogen and ethylene concentrations at 0.60 vol % and 35.0 mol %, respectively. Ethylene was further added and polymerization was carried out for 2.5 minutes with the hydrogen concentration of 0.55 vol % and the ethylene concentration of 40.0 mol %. The contents were transferred under pressure over 4 minutes to the autoclave D which had previously been charged with 10 kg of liquid propylene and 50 ml of isopropanol. The autoclave C1 was washed with liquid propylene and washing propylene was also transferred to the autoclave D. The autoclave C1 was made ready for the subsequent reception of slurry at about 3 kg/cm$^2$G. On the other hand, while the autoclave D was charged with isopropanol at a rate of 1 ml/h, the slurry was discharged from the bottom and transferred to the flush tank E. Finally powder was discharged from the hopper F. Discharge from the autoclave D was accomplished continuously at a rate of 40 kg/h, so that about 10 kg of slurry remained in the autoclave D when slurry was received from the autoclave C2. In the autoclave C2, copolymerization was carried out as in the autoclave C1 after charging of slurry from the autoclave B and methyl p-toluylate over 30 minutes. Batch-wise polymerization was repeated 25 times each, 50 times in total, in the autoclaves C1 and C2. About 250 kg of propylene-ethylene block copolymer was obtained as the product. The above-mentioned polymerization operation was continued without any trouble. The polymerization per unit weight of the solid catalyst was obtained from the content of Ti in the product. The resulting block copolymer was dried at 60° C., 100 mm Hg, for 10 hours, followed by pelletization with commonly used additives. Physical properties were measured for the pellets. Results are shown in Table 10.

EXAMPLE 15

Polymerization was carried out as in Example 14 with the following exceptions. Instead of adding methyl p-toluylate at a rate of 0.3 ml/30 min, tetraethoxysilane was added at a rate of 1.0 ml/30 min when the slurry was transferred to the autoclaves C1 and C2, so that the activity was decreased to about 2/5. The results are shown in Table 10.

EXAMPLE 16

Polymerization was carried out as in Example 14 with the following exceptions. Instead of adding methyl p-toluylate at a rate of 0.3 ml/30 min, methyl orthoacetate was added at a rate of 0.45 ml/30 min when the slurry was transferred to the autoclaves C1 and C2, so that the activity was decreased to about 2/5. The results are shown in Table 10.

TABLE 9

| | Polymerization Conditions | | | | | | | | | | | | | |
|---|---|---|---|---|---|---|---|---|---|---|---|---|---|---|
| | Continuous Polymerization | | | | Batch-wise Polymerization | | | | | | | | | |
| | | | | | First Stage | | | | | Second Stage | | | | |
| Example No. | Temperature °C. | Pressure kg/cm$^2$G | Ave. dwell time min | Hydrogen conc. vol % | Temperature °C. | Pressure kg/cm$^2$G | Time min | Hydrogen conc. vol % | Ethylene conc. mol % | Temperature °C. | Pressure kg/cm$^2$G | Time min | Hydrogen conc. vol % | Ethylene conc. mol % |
| Ex. No. 14 | A75 B75 | A32 B32 | A120 B120 | A6.5 B6.5 | 50 | 30.0 | 12 | 0.60 | 35 | 50 | 33.5 | 2.5 | 0.55 | 40.0 |
| Ex. No. 15 | A75 B75 | A32 B32 | A120 B120 | A6.5 B6.5 | 50 | 30.0 | 12 | 0.60 | 35 | 50 | 33.5 | 2.5 | 0.55 | 40.0 |
| Ex. No. 16 | A75 B75 | A32 A32 | A120 B120 | A6.5 B6.5 | 50 | 30.0 | 12 | 0.60 | 35 | 50 | 33.5 | 2.5 | 0.55 | 40.0 |

TABLE 10

| | Powder after continuous polymerization | | Powder of final product | | | Physical Properties | | | | | | | |
|---|---|---|---|---|---|---|---|---|---|---|---|---|---|
| | | | | | | | | | Sheet of final product | | | | |
| | | | | | | Bulk density g/ml | MI g/10 min | Ethylene content % | Flexural rigidity kg/cm$^2$ | DuPont Impact kg·cm/φ¼" | | Izod Impact kg·cm/cm | |
| Example No. | η | II % | Yield* | η | II % | | | | | 20° C. | −10° C. | 20° C. | −10° C. |
| Ex. No. 14 | 1.42 | 96.0 | 12800 | 2.05 | 91.2 | 0.36 | 7.8 | 9.6 | 11400 | 74 | 44 | 8.1 | 4.0 |
| Ex. No. 15 | 1.41 | 96.1 | 13100 | 2.01 | 91.5 | 0.35 | 7.8 | 10.0 | 11200 | 74 | 43 | 8.2 | 4.0 |
| Ex. No. 16 | 1.41 | 96.0 | 12900 | 2.10 | 90.6 | 0.35 | 7.3 | 9.8 | 11600 | 74 | 44 | 8.0 | 4.0 |

Remarks:
*Polymerization activity expressed in yield g/g-solid catalyst

EXAMPLE 17

Polymerization was carried out using the polymerization equipment as shown in FIG. 3. Into a 50-liter autoclave replaced with completely dry nitrogen were charged 30 l of n-heptane, 50 g of the solid catalyst obtained in step (i) of Example 1, 240 ml of diethylaluminum chloride, and 140 ml of methyl p-toluylate. The contents were stirred at 25° C. to make a catalyst slurry mixture. Two 300-liter autoclaves A and B replaced with completely dry nitrogen and then with propylene gas were connected in series. Two 200-liter autoclaves C1 and C2 were connected in parallel thereafter. A 300-liter autoclave D was connected in series to the autoclaves C1 and C2. The autoclaves A and B were charged with 60 kg of propylene. The autoclave A was charged with the aforesaid catalyst slurry mixture at a rate of 1 g/h as solid catalyst, triethylaluminum at a rate of 1.5 ml/h, and liquid propylene at a rate of 30 kg/h. The autoclave B was charged with triethylaluminum at a rate of 3.0 ml and polypropylene slurry continuously from the autoclave A at a rate of 30 kg/h. Simultaneously with charging, polypropylene slurry was discharged continuously from the autoclave B at a rate of 30 kg/h. Hydrogen was charged so that the concentration of hydrogen in the gas phase in the autoclaves A and B was kept as shown in Table 11. Under these conditions, polymerization was carried out at 75° C., and when polymerization became stable 6 hours after the start of polymerization, a small quantity of slurry was extracted from the autoclave B for measurement of properties of the powder. The slurry which was being discharged continuously from the bottom of the autoclave B was transferred together with methyl p-toluylate at a rate of 1.4 ml/30 min into the autoclave C1. After the transfer of slurry into C1 for 30 minutes, the destination of transfer of slurry from the autoclave B and methyl p-toluylate was switched from autoclave C1 to autoclave C2. In the autoclave C1, simultaneously with the reception of slurry, 5 kg of liquid propylene was charged under pressure while purging the gas phase part, and the temperature in the autoclave was kept at 50° C. and the hydrogen concentration was adjusted to 0.3 vol %. In these steps, the activity was decreased to about 1/5 due to the charging of methyl p-toluylate. Further, ethylene and hydrogen were charged so that the hydrogen concentration and ethylene concentration in the gas phase part were adjusted to 0.55 vol % and 35.0 mol %, respectively. Further, 3.0 ml of triethylaluminum was added under pressure all at once in order to increase the activity about 2.5 times. Polymerization was carried out at 50° C. for 9 minutes with the above-mentioned hydrogen and ethylene concentrations. Ethylene was further added and polymerization was carried for 2.0 minutes with the hydrogen concentration of 0.55 vol % and the ethylene concentration of 40.0 mol %. Then, 2 ml of methyl p-toluylate was added. The contents were transferred under pressure over 7 minutes to the autoclave D which had previously been charged with 10 kg of liquid propylene and 50 ml of isopropanol. The autoclave C1 was washed with liquid propylene and washing propylene was also transferred to the autoclave D. The autoclave C1 was made ready for the subsequent reception of slurry at about 3 kg/cm$^2$G. On the other hand, while the autoclave D was charged with isopropanol at a rate of 1 ml/h, the slurry was discharged from the bottom and transferred to the flush tank E. Finally powder was discharged from the hopper F. Discharge from the autoclave D was accomplished continuously at a rate of 40 kg/h, so that about 10 kg of slurry remained in the autoclave D when slurry was received from the autoclave C2. In the autoclave C2, copolymerization was carried out as in the autoclave C1 after charging of slurry from the autoclave B and methyl p-toluylate over 30 minutes. Batch-wise polymerization was repeated 25 times each, 50 times in total, in the autoclaves C1 and C2. About 250 kg of propylene-ethylene block copolymer was obtained as the product. The above-mentioned polymerization operation was continued without any trouble. The polymerization per unit weight of the solid catalyst was obtained from the content of Ti in the product. The resulting block copolymer was dried at 60° C., 100 mm Hg, for 10 hours, followed by pelletization with commonly used additives. Physical properties were measured for the pellets. Results are shown in Table 12.

EXAMPLE 18

Polymerization was carried out as in Example 17 with the following exceptions. Instead of adding methyl p-toluylate at a rate of 0.6 ml/30 min, tetraethoxysilane was added at a rate of 2.0 ml/30 min when the slurry was transferred to the autoclaves C1 and C2, so that the activity was decreased to about 1/5. The triethylaluminum to be added at the start of batch-wise polymerization in the autoclaves C1 and C2 was changed to 2 ml, so that the activity was increased to about 2.5 times. The results are shown in Table 10.

EXAMPLE 19

Polymerization was carried out as in Example 17 with the following exceptions. Instead of adding methyl p-toluylate at a rate of 1.4 ml/30 min, methyl orthoacetate was added at a rate of 0.9 ml/30 min when the slurry was transferred to the autoclaves C1 and C2, so that the activity was decreased to about ¼. The triethylaluminum to be added at the start of batch-wise polymerization in the autoclaves C1 and C2 was changed to 2.5 ml, so that the activity was increased to about 2.0 times. The results are shown in Table 12.

TABLE 11

| | Polymerization Conditions | | | | | | | | | | | | | |
|---|---|---|---|---|---|---|---|---|---|---|---|---|---|---|
| | Continuous Polymerization | | | | Batch-wise Polymerization | | | | | | | | | |
| | | | | | First Stage | | | | | Second Stage | | | | |
| Example No. | Temperature °C. | Pressure kg/cm$^2$G | Ave. dwell time min | Hydrogen conc. vol % | Temperature °C. | Pressure kg/cm$^2$G | Time min | Hydrogen conc. vol % | Ethylene conc. mol % | Temperature °C. | Pressure kg/cm$^2$G | Time min | Hydrogen conc. vol % | Ethylene conc. mol % |
| Ex. No. 17 | A75 B75 | A32 B32 | A120 B120 | A6.5 B6.5 | 50 | 30.0 | 9 | 0.55 | 35 | 50 | 33.5 | 2.0 | 0.50 | 40.0 |
| Ex. No. 18 | A75 B75 | A32 B32 | A120 B120 | A6.5 B6.5 | 50 | 30.0 | 10 | 0.55 | 35 | 50 | 33.5 | 2.5 | 0.50 | 40.0 |
| Ex. No. 19 | A75 B75 | A32 A32 | A120 B120 | A6.5 B6.5 | 50 | 30.0 | 10 | 0.55 | 35 | 50 | 33.5 | 2.5 | 0.50 | 40.0 |

TABLE 12

| Example No. | Powder after continuous polymerization η | II % | Powder of final product Yield* | η | II % | Bulk density g/ml | MI g/10 min | Ethylene content % | Flexural rigidity kg/cm² | DuPont Impact kg·cm/φ⅛" 20° C. | -10° C. | Izod Impact kg·cm/cm 20° C. | -10° C. |
|---|---|---|---|---|---|---|---|---|---|---|---|---|---|
| Ex. No. 17 | 1.41 | 96.0 | 12000 | 2.06 | 92.0 | 0.36 | 7.5 | 8.1 | 12000 | 78 | 46 | 8.5 | 4.0 |
| Ex. No. 18 | 1.42 | 96.1 | 12800 | 2.04 | 92.1 | 0.36 | 7.8 | 7.9 | 12300 | 76 | 45 | 8.5 | 4.0 |
| Ex. No. 19 | 1.40 | 96.0 | 12100 | 2.07 | 92.2 | 0.36 | 7.4 | 7.9 | 12100 | 77 | 45 | 8.2 | 4.0 |

Remarks:
*Polymerization activity expressed in yield g/g-solid catalyst

What is claimed is:

1. A process for producing a propylene-ethylene block copolymer in the presence of a stereospecific catalyst by use of two or more polymerization vessels connected together in series, which comprises (i) polymerizing propylene alone or propylene and ethylene at an ethylene/propylene reaction ratio lower than 6/94 by weight and then (ii) polymerizing ethylene and propylene at an ethylene/propylene reaction ratio of 15/85 to 95/5 by weight, wherein the polymerization reaction is carried out in bulk with substantially no inert medium, wherein polymerization step (i) is conducted continuously to obtain 60 to 95% by weight of the desired polymer based on the total polymer and polymerization step (ii) is conducted batch-wise to obtain 40 to 5% by weight of the desired polymer based on the total polymer, wherein the continuous polymerization of step (i) is conducted in vessels in series except for the last vessel, said last vessel consisting of two or more vessels connected in parallel and wherein the batch-wise polymerization of step (ii) is conducted alternately in said vessels connected in parallel, wherein when the polymer slurry is transferred from the polymerization vessels for continuous polymerization to the polymerization vessels for batch-wise polymerization, a catalyst deactivator is added to the slurry so that the catalyst activity is decreased to less than ⅔ of that which would be when said catalyst deactivator is not added, and after completion of polymerization in the batch-wise polymerization vessels, a catalyst deactivator is added so that the catalyst activity is decreased to less than ½ of that which would be when said deactivator is not added.

2. A process for producing a propylene-ethylene block copolymer in the presence of a stereospecific catalyst by use of two or more polymerization vessels connected together in series, which comprises (i) polymerizing propylene alone or propylene and ethylene at an ethylene/propylene reaction ratio lower than 6/94 by weight and then (ii) polymerizing ethylene and propylene at an ethylene/propylene reaction ratio of 15/85 to 95/5 by weight, wherein the polymerization reaction is carried out in bulk with substantially no inert medium, wherein polymerization step (i) is conducted continuously to obtain 60 to 95% by weight of the desired polymer based on the total polymer and polymerization step (ii) is conducted batch-wise to obtain 40 to 5% by weight of the desired polymer based on the total polymer, wherein the continuous polymerization of step (i) is conducted in vessels in series except for the last vessel, said last vessel consisting of two or more vessels connected in parallel and wherein the batch-wise polymerization of step (ii) is conducted alternately in said vessels connected in parallel, wherein when the polymer slurry is transferred from the polymerization vessels for continuous polymerization to the polymerization vessels for batch-wise polymerization, a catalyst deactivator is added to the slurry so that the catalyst activity is decreased to less than ⅔ of that which would be when said catalyst deactivator is not added, and after completion of polymerization in the batch-wise polymerization vessels, the catalyst is deactivated within less than ⅓ of the time prescribed for polymerization in the batch-wise polymerization vessels.

3. A process for producing a propylene-ethylene block copolymer in the presence of a stereospecific catalyst by use of two or more polymerization vessels connected together in series, which comprises (i) polymerizing propylene alone or propylene and ethylene at an ethylene/propylene reaction ratio lower than 6/94 by weight and then (ii) polymerizing ethylene and propylene at an ethylene/propylene reaction ratio of 15/85 to 95/5 by weight, wherein the polymerization reaction is carried out in bulk with substantially no inert medium, wherein polymerization step (i) is conducted continuously to obtain 60 to 95% by weight of the desired polymer based on the total polymer and polymerization step (ii) is conducted batch-wise to obtain 40 to 5% by weight of the desired polymer based on the total polymer, wherein the continuous polymerization of step (i) is conducted in vessels in series except for the last vessel, said last vessel consisting of two or more vessels connected in parallel and wherein the batch-wise polymerization of step (ii) is conducted alternately in said vessels connected in parallel, wherein when the polymer slurry is transferred from the polymerization vessels for continuous polymerization to the polymerization vessels for batch-wise polymerization, a catalyst deactivator is added to the slurry so that the catalyst activity is decreased to less than ¼ of that which would be when said catalyst deactivator is not added, and after the transfer of the slurry is complete, an organoaluminum compound is added so that the catalyst activity is increased to more than 1.1 times then that which would be before said catalyst activator is added, and on completion of the batch-wise polymerization, a catalyst deactivator is added so that the catalyst activity is decreased to less than ½ of that which would be when said deactivator is not added.

4. A process for producing a propylene-ethylene block copolymer in the presence of a stereospecific catalyst by use of two or more polymerization vessels connected together in series, which comprises (i) polymerizing propylene alone or propylene and ethylene at an ethylene/propylene reaction ratio lower than 6/94 by weight and then (ii) polymerizing ethylene and propylene at an ethylene/propylene reaction ratio of 15/85 to 95/5 by weight, wherein the polymerization reaction is carried out in bulk with substantially no inert medium, wherein polymerization step (i) is conducted continuously to obtain 60 to 95% by weight of the desired polymer based on the total polymer and polymerization step (ii) is conducted batch-wise to obtain 40 to 5% by weight of the desired polymer based on the total polymer, wherein the continuous polymerization of step (i) is conducted in vessels in series except for the last vessel, said last vessel consisting of two or more vessels connected in parallel and wherein the batch-wise polymerization of step (ii) is conducted alternately in said vessels connected in parallel, wherein when the polymer slurry is transferred from the polymerization vessels for continuous polymerization to the polymerization vessels for batch-wise polymerization, a catalyst deactivator is added to the slurry so that the catalyst activity is decreased to less than $\frac{1}{4}$ of that which would be when said catalyst deactivator is not added, and after the transfer of the slurry is complete, an organoaluminum compound is added so that the catalyst activity is increased to more than 1.1 times then that which would be before said compound is added, and on completion of the batch-wise polymerization, a catalyst is deactivated within less than $\frac{1}{3}$ of the time prescribed for polymerization in the batch-wise polymerization vessels.

5. The process as claimed in claim 1, wherein polymerization step (i) is carried out at 60° to 85° C. and polymerization step (ii) is carried out at 30° to 65° C.

6. The process as claimed in claim 2, wherein polymerization step (i) is carried out at 60° to 85° C. and polymerization step (ii) is carried out at 30° to 65° C.

7. The process as claimed in claim 3, wherein polymerization step (i) is carried out at 60° to 85° C. and polymerization step (ii) is carried out at 30° to 65° C.

8. The process as claimed in claim 4, wherein polymerization step (i) is carried out at 60° to 85° C. and polymerization step (ii) is carried out at 30° to 65° C.

9. The process as claimed in claim 1, wherein the stereospecific catalyst consists of (i) a solid catalyst containing at least three elements of Mg, Ti, and Cl, and (ii) an organoaluminum compound, and the yield of the polymer per unit weight of said solid catalyst is greater than 4000 g/g-solid catalyst.

10. The process as claimed in claim 2, wherein the stereospecific catalyst consists of (i) a solid catalyst containing at least three elements of Mg, Ti, and Cl, and (ii) an organoaluminum compound, and the yield of the polymer per unit weight of said solid catalyst is greater than 4000 g/g-solid catalyst.

11. The process as claimed in claim 3, wherein the stereospecific catalyst consists of (i) a solid catalyst containing at least three elements of Mg, Ti, and Cl, and (ii) an organoaluminum compound, and the yield of the polymer per unit weight of said solid catalyst is greater than 4000 g/g-solid catalyst.

12. The process as claimed in claim 4, wherein the stereospecific catalyst consists of (i) a solid catalyst containing at least three elements of Mg, Ti, and Cl, and (ii) an organoaluminum compound, and the yield of the polymer per unit weight of said solid catalyst is greater than 4000 g/g-solid catalyst.

* * * * *